(No Model.) 2 Sheets—Sheet 1.
F. G. WHEELER.
METHOD OF HEATING WATER IN STEAM GENERATORS.
No. 352,283. Patented Nov. 9, 1886.
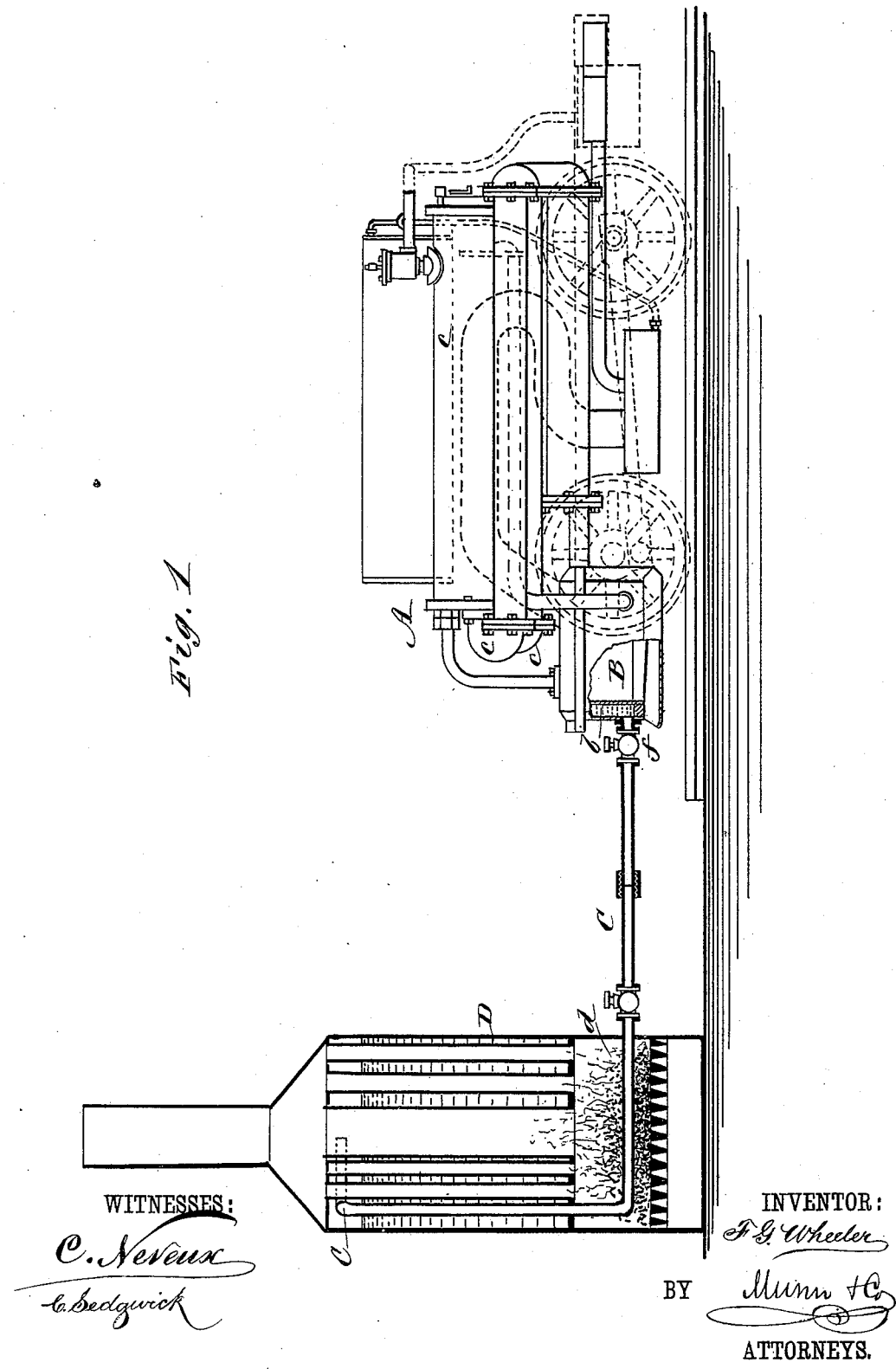
WITNESSES:
C. Neveux
C. Sedgwick
INVENTOR:
F. G. Wheeler
BY Munn & Co
ATTORNEYS.

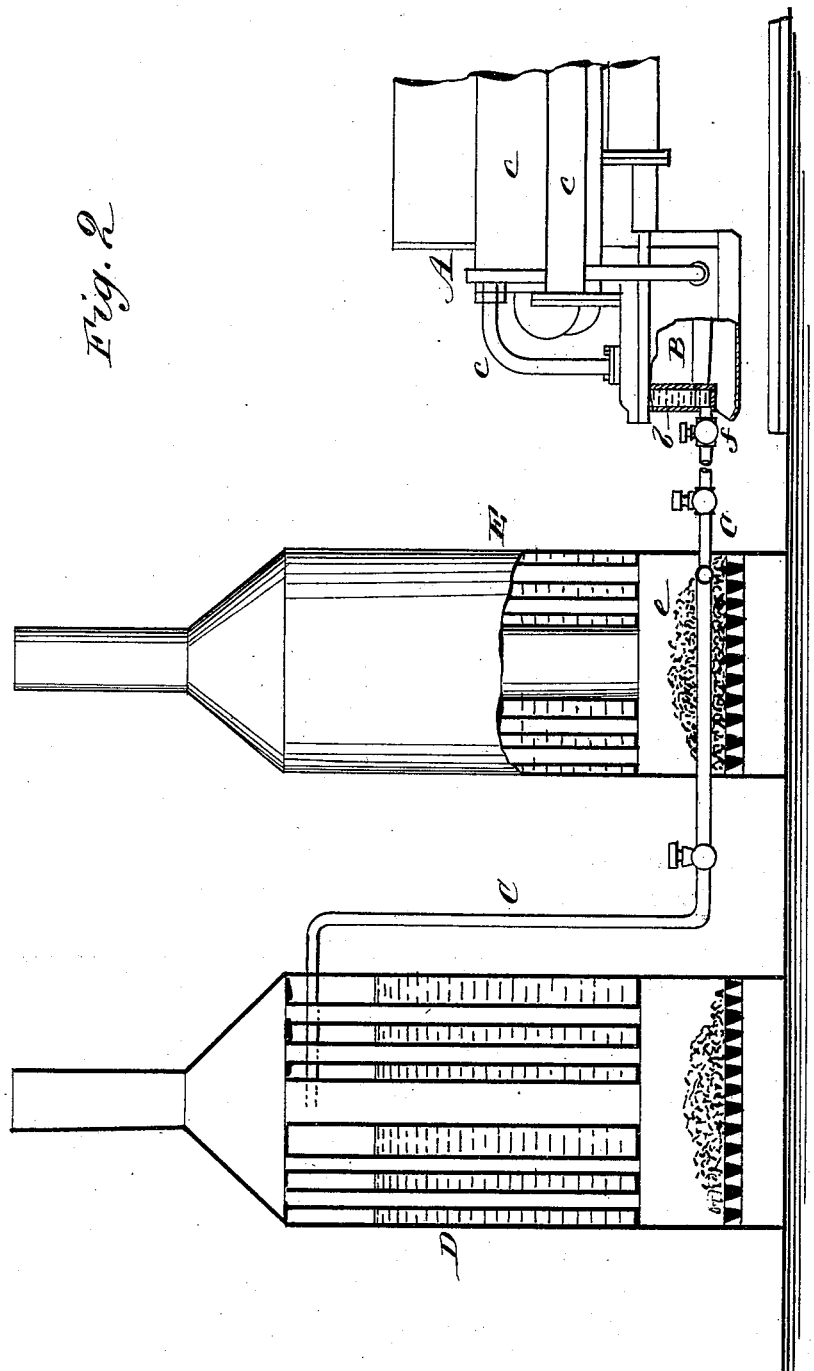

UNITED STATES PATENT OFFICE.

FREDERICK G. WHEELER, OF NEW YORK, N. Y.

METHOD OF HEATING WATER IN STEAM-GENERATORS.

SPECIFICATION forming part of Letters Patent No. 352,283, dated November 9, 1886.

Application filed December 26, 1885. Serial No. 186,754. (No model.)

*To all whom it may concern:*

Be it known that I, FREDERICK G. WHEELER, of the city, county, and State of New York, have invented a new and Improved Method of Heating Water in Steam-Generators for Street-Locomotives and other Engines, of which the following is a full, clear, and exact description.

My present invention consists in an improved method of applying preliminary heat to steam-generators, either stationary or locomotive, but more especially to the steam-generator described in the Letters Patent granted to me on June 3, 1884, No. 299,607, and is supplementary thereto, in which patent there is described a system of charging the generator with hot water. In place of first charging such generator, however, with hot water, as described in said patent, I charge the system to the extent required with cold water, or water at a comparatively low temperature, in the ordinary or any suitable manner. I then obtain the initial heating in the system by the injection from an independent boiler of superheated steam at high pressure until the entire charge of cold water, or water at a comparatively low temperature, is heated to the required degree.

Reference is to be had to the accompanying drawings, forming part of this specification, in which similar letters of reference indicate corresponding parts in both the figures.

Figure 1 represents a partly-sectional side elevation, showing the invention applied to a motor for street or other locomotive purposes or its generator of like construction to that in my aforesaid patent, and Fig. 2 is a partly-sectional side elevation of a modification of the same.

Referring in the first instance to Fig. 1 of the drawings, A is the generator to which the initial heat is to be imparted by my improved method, and which is provided with the heating-furnace B, having a surrounding water-chamber, *b*, connected to a series of circulating storage-tubes, *c*, as in my Letters Patent hereinbefore referred to, or other storage and circulating tubes otherwise arranged in connection with said water-chamber.

C is a pipe from an independent boiler, D, of any suitable construction, stationary or otherwise, for supplying superheated steam to the generator A. The steam-supply pipe C, starting from the dome or upper steam-space of the independent boiler D, will pass through the furnace *d* of said boiler, and from thence to the generator A, which has been previously charged with cold water, or water at a comparatively low temperature; or, as shown in Fig. 2 of the drawings, the supply-pipe C, starting from the dome or upper steam-space of the boiler D, may pass through an independent furnace, or through a furnace, *e*, of another independent boiler, E, as desired. The pipe C is or should be supplied with one or more suitable valves for shutting off egress of the steam as required, and when the generator to which initial heat by superheated steam is required to be imparted is that of a street-car or other locomotive, as shown in Fig. 1, said pipe C should be made adjustable or attachable and detachable from the generator or water-chamber inclosing its furnace, and a cock or valve, *f*, be applied where the connection is made with the generator. This provides for the discharge of superheated steam through the cock or valve *f* into the intermediate water-chamber, *b*, and from thence into the generating system of the motor-car to rapidly heat the water therein through the storage and circulating pipes shown and described in my Letters Patent No. 299,607. This is continued until the entire charge of unheated water in the generator A is heated to the extent required. The steam-pipe C is then disconnected and valve *f* closed, and the steam-pressure in the generator A is afterward maintained by a small fire in the furnace B, as in my patent hereinbefore referred to. When the generator to which the superheated steam passes is a stationary one, then the pipe C may be a permanent attachment.

The advantages of this improved method of heating water in steam-generators are that the steam for heating can be applied to the generator from a source either near or comparatively remote, as circumstances may require, thereby avoiding the necessity of locating the source of heat at precise points; and, further, the great economy which will ensue from the fact that the superheated steam in parting with its latent heat will more rapidly diffuse and communicate the required degree of heat through the body of water in the generator, whereas in the ordinary process of heating the water to the boiling-point by convection, or through the direct agency of the furnace, this advantage is not attained, and much more time is consumed. By not being restricted to any precise distance for the boiler which generates the steam to be superheated from the generator to be charged, which may be either near or remote, a great convenience is afforded.

This improved method or system is, as hereinbefore observed, intended to supplement that described in Patent No. 299,607, and to serve a more complete purpose for the ends designed in that patent. Thus it combines the small auxiliary fire for permanent heat with the herein-described means of securing the initial heating of the water, without the combination of the auxiliary fire and an initial charge of hot water, as in the patent of Eugene H. Angamar, No. 197,584, dated November 27, 1877. Furthermore, the same system or method is applicable to stationary generators with great convenience and advantage by the interposition of a supplementary furnace between the boiler making the initial steam and the generator or system to be supplied, and through which the steam may be passed in suitable pipes, and thereby be superheated, as required. This mode of applying the invention is illustrated in Fig. 2 of the drawings.

Having thus described my invention, what I claim as new, and desire to secure by Letters Patent, is—

1. The herein-described method of imparting initial heat to the water in the generator of a street-car or other motor, which consists in the injection of superheated steam into and through a water-chamber surrounding the fire-box of the generator, and from thence through a series of storage and circulating tubes connected therewith and arranged for the evolution of steam, essentially as specified.

2. In the method herein described of imparting initial heat to the water in the generator of a locomotive or motor-car, first generating steam in an independent boiler, then passing it under cover through the furnace of said boiler or through an independent furnace, and afterward through an adjustable or attachable and detachable pipe connection to and through an intermediate water-chamber, and from thence to the generator and main water-supply, substantially as specified.

3. The combination, with the fire-box and water-chamber and water-circulating tubes of the generator of the motor, substantially as described, of a separate and detachable steam-generator provided with means adapted to superheat the steam generated therein, and to transmit such superheated steam to the water in the generator of the motor for the purpose of initially heating the water in the generator of the motor, as herein set forth.

FREDERICK G. WHEELER.

Witnesses:
A. GREGORY,
EDGAR TATE.